Feb. 18, 1941.  H. J. SMITH  2,232,486
SOUND RECORDER AND REPRODUCER
Filed Nov. 10, 1937   8 Sheets-Sheet 1

Inventor:
Harold J. Smith.
By
Attorneys

Feb. 18, 1941.  H. J. SMITH  2,232,486
SOUND RECORDER AND REPRODUCER
Filed Nov. 10, 1937  8 Sheets-Sheet 2

Inventor:
Harold J. Smith.
Attorneys

Feb. 18, 1941.  H. J. SMITH  2,232,486
SOUND RECORDER AND REPRODUCER
Filed Nov. 10, 1937    8 Sheets-Sheet 4

Fig. 6.

Inventor:
Harold J. Smith,
Attorneys

Feb. 18, 1941.                H. J. SMITH                2,232,486
                      SOUND RECORDER AND REPRODUCER
                         Filed Nov. 10, 1937        8 Sheets-Sheet 5

Inventor:
Harold J. Smith,
By:
Attorneys:

Feb. 18, 1941.   H. J. SMITH   2,232,486
SOUND RECORDER AND REPRODUCER
Filed Nov. 10, 1937   8 Sheets-Sheet 6

Inventor:
Harold J. Smith,
By
Chittre, Wiles, Davies, Hirsch & Dawson
Attorneys Feb. 18, 1941.  H. J. SMITH  2,232,486

SOUND RECORDER AND REPRODUCER

Filed Nov. 10, 1937  8 Sheets—Sheet 8

Patented Feb. 18, 1941

2,232,486

UNITED STATES PATENT OFFICE 2,232,486

SOUND RECORDER AND REPRODUCER

Harold J. Smith, Riverside, Ill., assignor to Technical Research Corporation, Chicago, Ill., a corporation of Delaware Application November 10, 1937, Serial No. 173,920

2 Claims. (Cl. 274—11)

This invention relates to a sound recorder and reproducer, and more particularly to a device for recording sound on a film and for reproducing the recorded sound from the film. The device is applicable for use in reporting court proceedings but has many other uses.

This invention is in some respects an improvement on the apparatus described in my Patent No. 2,167,817 issued August 1, 1939.

An object of the invention is to provide an improved apparatus of simple, compact construction which will faithfully record and reproduce speech and music, and in which sound distortion is reduced to a minimum.

In previous structures of this nature, the recording and reproducing mechanisms have been mounted as a single unit and movable together for shifting from one sound track to the next. I have found that much of the distortion in recording is due to the vibrations of the reproducer which are transferred back to the recording mechanism. To overcome this source of distortion, I provide a device in which the reproducer and recorder are independent of each other and are moved laterally of the film through different actuation, the mechanisms being independently mounted.

A further object is to provide mechanism in which the reproducer may easily be turned to operate at any desired groove on the film without disturbing the continuous operation of the recording mechanism. It is desired to be able to operate either the recorder or reproducer at any portion of the film independently of the operation of the other, and it is desired that either recording or reproducing mechanism be easily changed to operate on a different portion of the film independently of the other mechanism.

Another object of the invention is to provide improved means for driving the film which means will be positive in effect and adapted to start and stop the motion of the film in a minimum of time.

Another object is to provide improved guide means for guiding the film as it passes through the mechanisms. There has long been serious difficulty in properly positioning the film throughout the recording operations. This difficulty has arisen because the film is widened slightly each time a sound groove is cut, and this widening action is multiplied when many parallel tracks are cut on the film. As a result, if a blank film is held sufficiently tight between its edges as it passes through the mechanisms, the film will be widened so as to buckle after it has had several sound grooves cut in it. I overcome this difficulty by providing spring pressed means in contact with the outer edge of the film.

A further object of the invention is to provide novel means for changing over the operation to a second set of mechanisms which record on and reproduce from a second reel of film. It is desired that the reels of film be easily changed and that there be no interruption of operation during such change of reels. It is further desired that the reels be of such construction as to enable the easy removal or replacement of film thereon and that the reels be provided with means for adjusting the effective size of their peripheries.

Other objects and advantages will become apparent as the specification proceeds.

The invention is illustrated in a preferred embodiment by the accompanying drawings in which.

As illustrated, A designates a casing or housing; B, a frame within the housing; C and C', resiliently mounted supporting plates on each of which are carried a recording mechanism, a reproducing mechanism and a film-driving mechanism.

The housing A may be of any suitable shape or form, and preferably has its sides 10 and 11 mounted on hinges so that they may be turned aside to allow access to the interior mechanisms. The top 12 of casing A is preferably removable also so as to permit inspection of the interior mechanism. A plate 50 forms the bottom of the casing and may be provided with skirt portions 50ª if desired.

The frame B within housing A comprises a pair of plates 13 and 14 secured in spaced relation, and each of these plates is provided with a central opening 15. For convenience, the plate 13 will be designated as being on the left hand side of the machine and the plate 14 on the right hand side. If desired, the housing plates 10ª and 11ª may be inserted between plates 13 and 14 to provide end compartments convenient for storing electrical connecting cords, etc.

Figure 1:
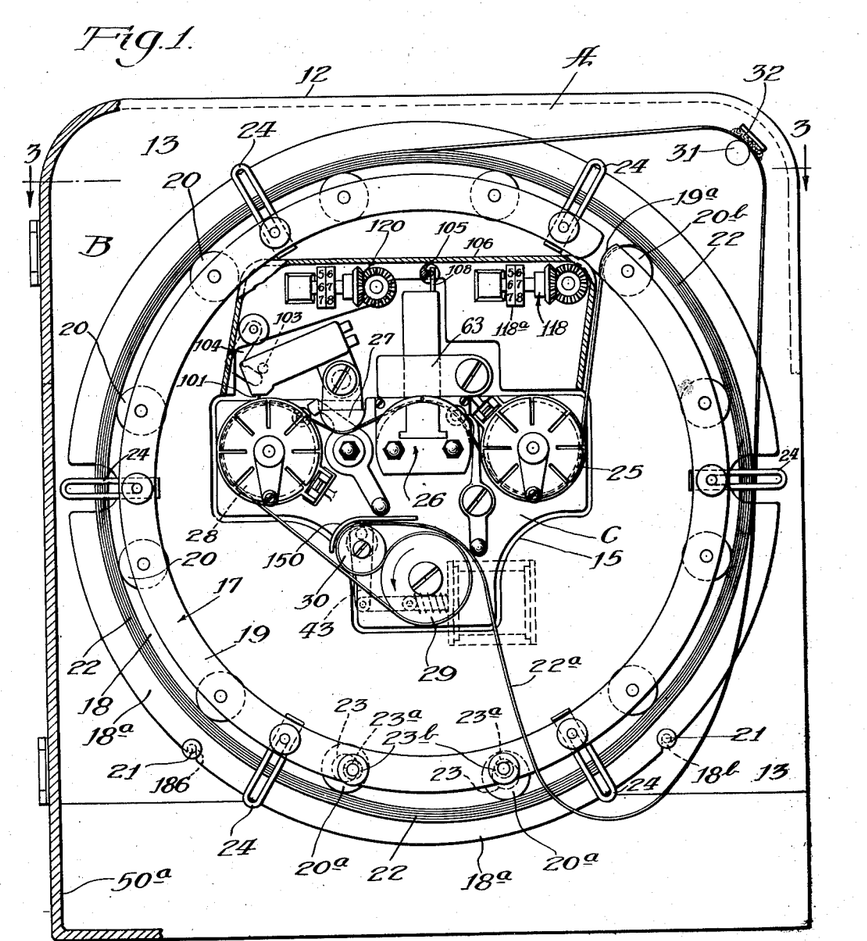
Figure 1 is a view in side elevation of the device, the side of the casing being broken away to expose the mechanism.

Mounted within opening 15 in plate 13, as shown in Figure 1, is the plate C which is of a shape corresponding with opening 15 and which is resiliently held within this opening by springs 16 which are attached on the inner side of plates C and 13, and which extend diagonally from the corners of plate C. Springs 16 may be of any suitable type and may be arranged in any suitable way for resiliently supporting plate C within the opening.

As more clearly shown in Figure 1, a reel 17 is mounted on the outside of plate 13. This reel comprises an inner ring 18 and an outer ring 19, between which the rollers 20 are carried at spaced intervals about the circumference of the rings. The inner ring 18 is provided with an annular flange 18ª which may be equipped with any suitable means for attachment to the plate 13. The reel may be conveniently mounted on the frame plate 13, for example, by such as pins 21 secured to the plate and adapted to engage slots 18ᵇ in the reel.

A continuous band of film 22 is carried over rollers 20 and comprises a number of turns. The inner turn of film is connected to the outer turn by a loose loop portion 22ª. For allowing the film to be easily removed and replaced, the outer ring 19 is cut away at 19ª.

To permit adjustment of the reel to tighten or loosen the film, I mount one or more of the rollers 20, preferably the lowermost of these rollers, eccentrically between the rings. As shown more clearly in Figure 1, the pins 23 extending through the centers of rollers 20ª have studs 23ª eccentrically located on the ends of pins 23 which studs are journaled in the rings 18 and 19. If desired, a knob 23ᵇ may be secured to studs 23ª on the outside of ring 18 for convenience in adjusting the rollers 22ª. It will be observed that by turning the shafts of rollers 20ª to bring these shafts to their outer positions, the effective circumference of the reel is increased and the film is tightened about the reel. In this construction the rollers 20ª may be turned to their inner positions to loosen the film on the reel, permitting its easy removal.

For retaining the film on the rollers, I provide a number of adjustable fingers 24 which are slotted and slidable radially inward of the reel to permit mounting of the film on the rollers.

The path of the film as it passes through the machine, may be followed more clearly by reference to Figure 1 of the drawings. From the inner or under turn the film band is directed downwardly from roller 20ᵇ, under the roller 25, thence upwardly over anvil 26 which is associated with the recording mechanism, thence under stationary guide 27, and over and about roller 28 where the film comes into contact with the stylus of the reproducing mechanism. From roller 28, the film passes about drive roller 29 and between this roller and the clutch roller 30. From the clutch roller 30, the film is allowed to fall in the loose loop 22ª, passing in front of the reel to a guiding pin 31 and then to the outside turn. A felt lined finger 32 may be provided if desired, to clean the film of dust or lint, also to give it a slight tension as it is wound on the reel.

Each of rollers 25, 28, 29 and 30 are all aligned with the film on the reel, so that in passing from the under turn of the film through the path described until the film passes loosely from clutch roller 30, the film is in no way twisted or turned from the plane of the film reel.

Figure 5:
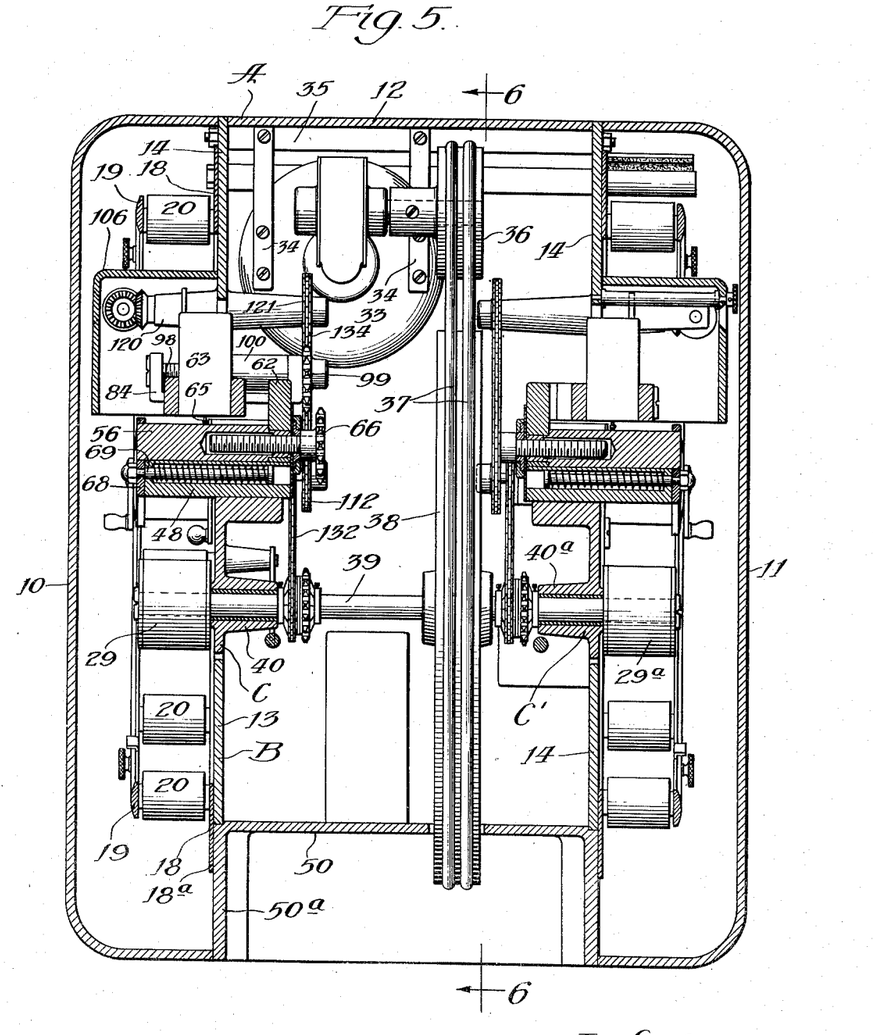
Figure 5, a vertical sectional view taken as indicated at line 5—5 of Figure 3.
Figure 6:
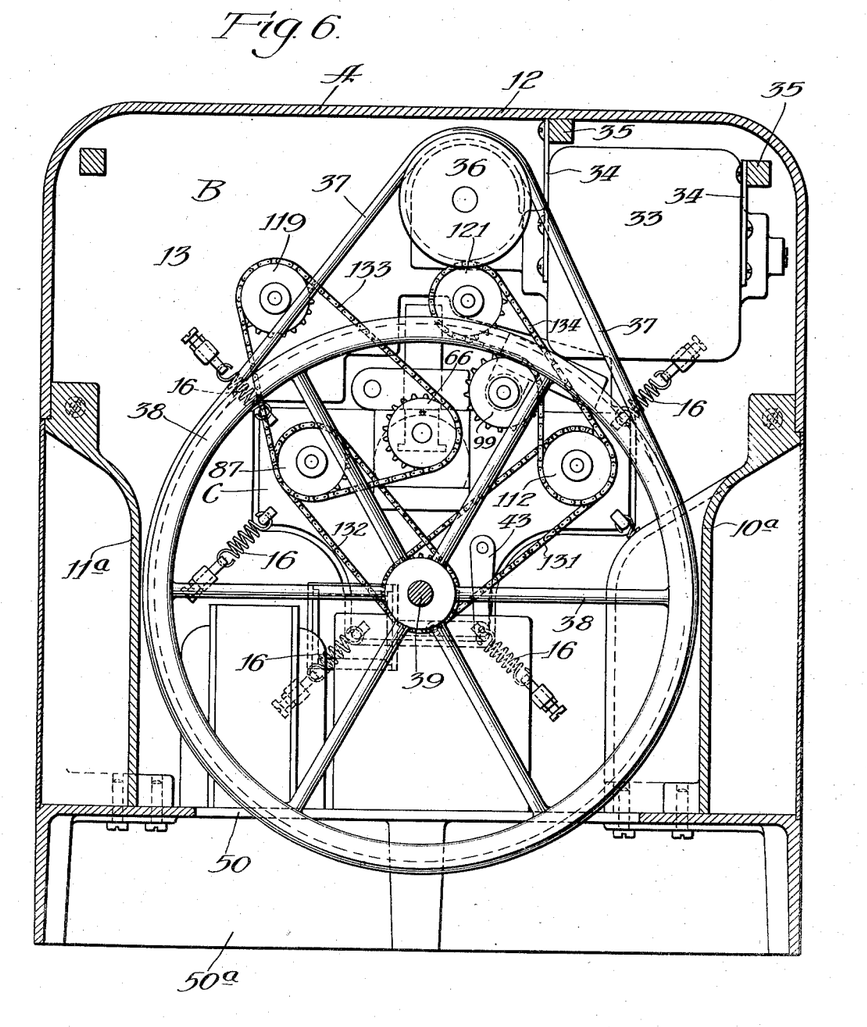
Figure 6, a vertical sectional view taken as indicated at line 6—6 of Figure 5.

The power for driving the machine is supplied by the electric motor 33 which is of any suitable and well known type and may be mounted in a convenient position between plates 13 and 14 as by the bars 34 and 35 illustrated more clearly in Figures 5 and 6. The shaft of motor 33 is connected through suitable reduction gearing to the pulley 36, and pulley 36 is connected by belt 37 with the wheel 38 which is secured to the main shaft 39. One end portion of shaft 39 is journaled within boss 40 of plate C, and the other end portion of this shaft is journaled in the boss 40ª of plate C'. It may here be stated that the plate C' is substantially identical with plate C and is resiliently suspended within opening 15 of plate 14 just as plate C is suspended within opening 15 of plate 13. Secured to the left hand end of shaft 39 and on the outside of plate C is the drive roller 29 previously referred to, and secured to the right hand end of this shaft is the roller 29ª outside the right hand plate C'. The film on each side of the machine may be held in contact with the drive rollers through pressure exerted against the film by the drive rollers 29 or 29ª previously mentioned, and the film is driven through frictional engagement between these drive rollers and the film. Preferably, each of rollers 29 and 29ª have a resilient material such as rubber on their outer surface portion for better gripping of the film.

Figure 2:
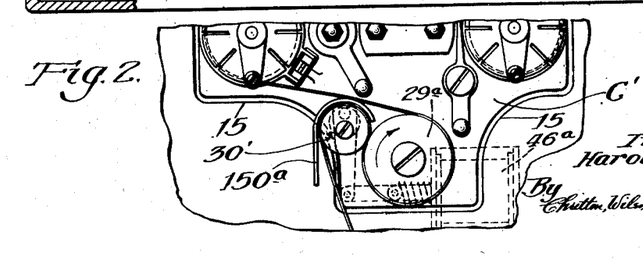
Figure 2, a broken view of the driving mechanism on the side of the device opposite the side shown in Figure 1.

With the exception of the threading of the film about the drive rollers, the two sides of the machine may be regarded as identical, the recording and reproducing mechanism being the same. On the left hand side (Figure 1) the film is directed about roller 29 in a counter clockwise direction, and about clutch roller 30 in a clockwise direction, while on the right hand side (Figure 2) the film is directed about the drive roller 29ª in a clockwise direction and about the clutch roller 30' in a counter clockwise direction.

Figure 11:
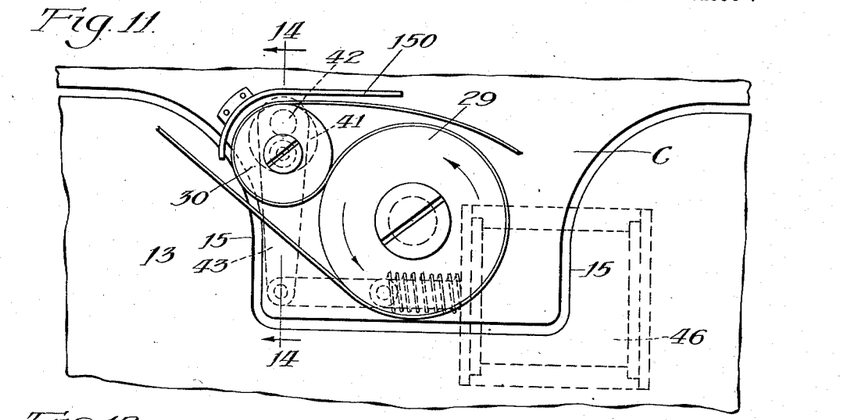
Figure 11, a detail view in side elevation showing the drive mechanism on one side of the device, the same side as is shown in Figures 1 and 8, and which, for convenience, will be called the left hand side of the machine.
Figure 12:
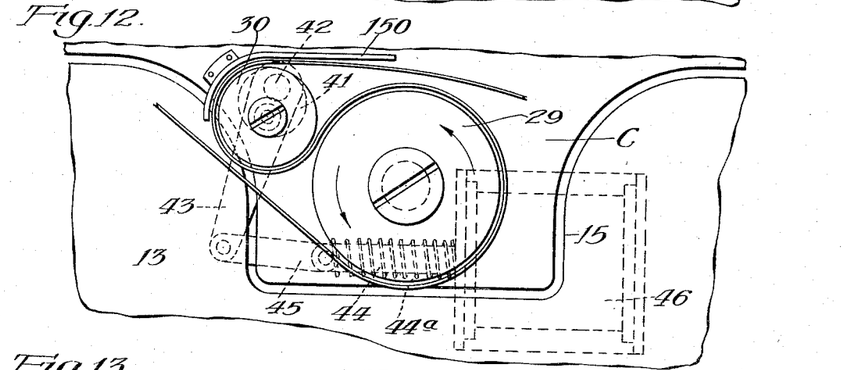
Figure 12, is a detail view in side elevation showing the drive mechanism on the other side of the machine, which, for convenience, will be called the right hand side of the machine.
Figures 13, 14:
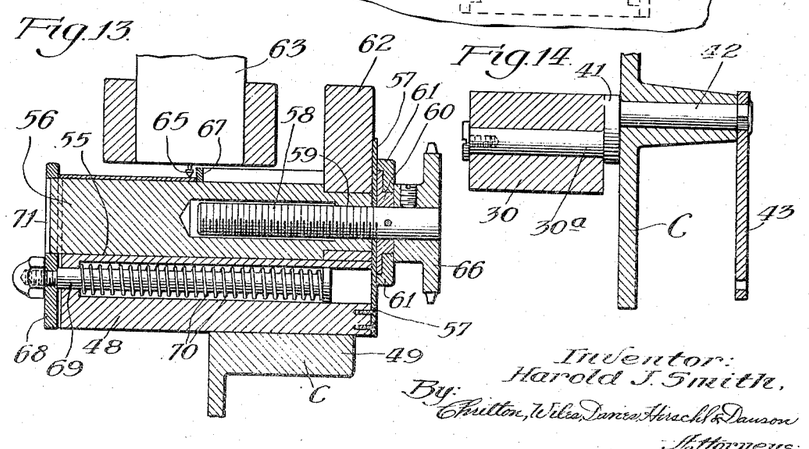
Figure 13, a vertical sectional view taken as indicated at line 13—13 of Figure 8.
Figure 14, a detail sectional view taken as indicated at line 14—14 of Figure 11.

The clutch mechanism for starting and stopping the film is best seen with reference to Figures 11, 12 and 14 of the drawings. The shaft 30ᵃ upon which clutch roller 30 is rotatably mounted, is provided with the plate 41. On the inner side of plate 41 is a pin 42 located eccentrically with respect to shaft 30 and journaled in plate C. The inner end of pin 42 is secured to the lever arm 43 which at its lower end is connected to the plunger 44 by link 45. A solenoid 46, suitably mounted on the inside of plate C and electrically connected in a manner later described, receives plunger 44 and is adapted to urge this plunger rearwardly when energized. A spring 47 is so arranged as to maintain plunger 44 in retracted position when the solenoid is not electrically energized.

It will be understood that upon energization of the solenoid, plunger 44 will be pulled rearwardly, turning arm 43 and piece 41 about pin 42 as a pivot. This action causes roller 30, which is eccentric with respect to pin 42, to be moved rearwardly, pushing the film tight against the drive roller. Figure 12 shows the clutch roller in retracted position with the film extending about drive roller 29 but not in frictional engagement with the roller. With the clutch roller in this position the film remains motionless and is not driven though the drive roller 29 is in rotation. Figure 11 shows the plunger 44 drawn by solenoid against the tension of spring 44ᵃ and the clutch roller 30 in engaging position. This causes drive roller 29 to grip the film and pull it through the recording and reproducing mechanism in the path previously indicated.

Figures 7, 8:
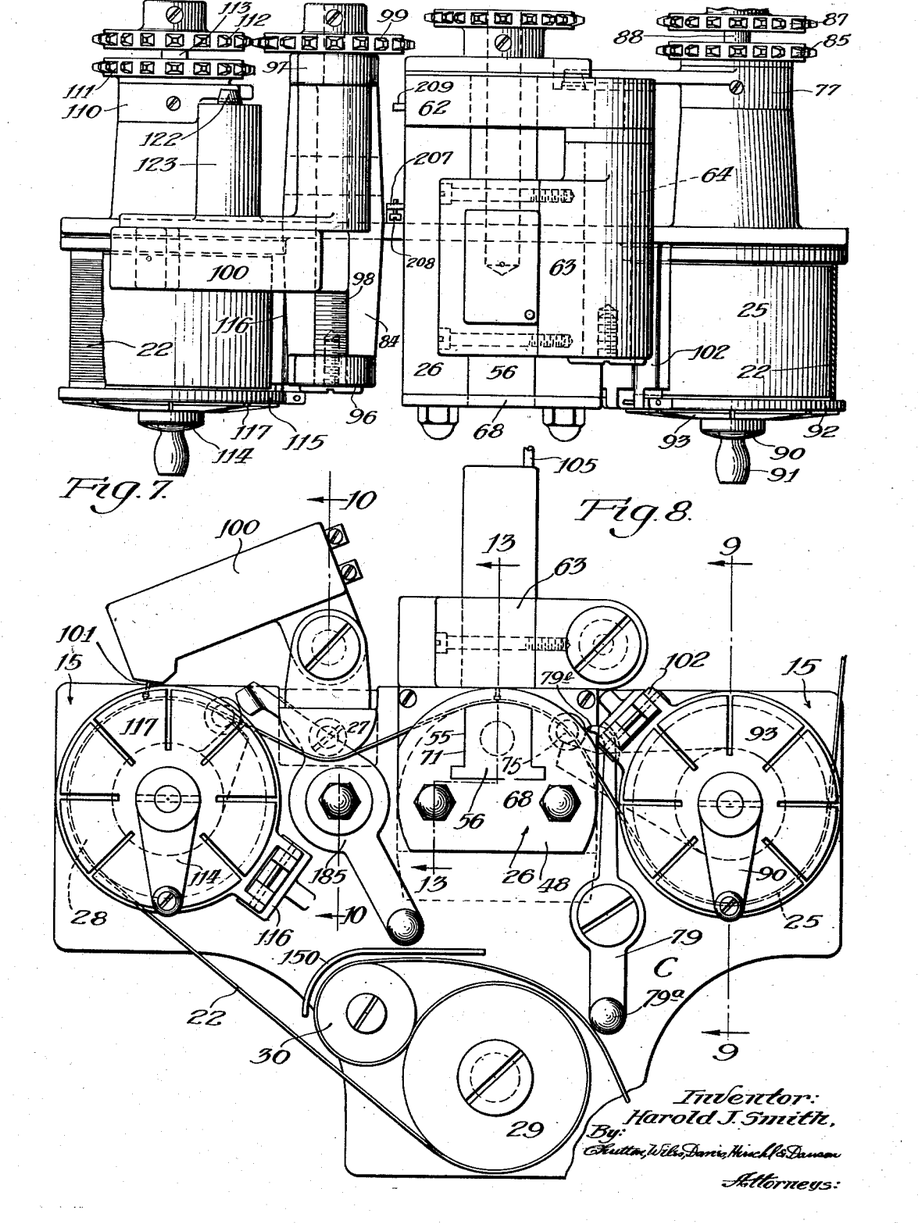
Figure 7, a detail plan view partly in section of the recording and reproducing mechanisms carried on one side of the device.
Figure 8, a detail elevational view of the recording, reproducing, and film driving mechanisms carried on one side of the device.

With particular reference to Figures 7, 8 and 13, the structure effective in recording the sound on the film will now be described. An anvil block 48 is fixedly supported on plate C. This block has its outer end portion of part cylindrical form having a curved upper surface, and is positioned transversely in an opening of plate C, being supported on plate boss 49. In its upper portion, block 48 is provided with a longitudinal channel 55, which is wider at its bottom. Into this channel is fitted a slidable anvil insert 56 of the same general shape in cross section as channel 55. The top surface of member 56 is curved and flush with the curved top of block 48. The anvil block 48 provides on its upper surface a curved track 59 which receives the film. The slidable anvil insert 56 which extends a substantial distance along the channel 55 provides a curved upper surface forming a continuation of surface 56 so that it serves to support that portion of the film extending over the channel 55. In other words, the curved top surface of the anvil insert 56 cooperates with the curved surface of the anvil block, providing a continuous curved track along which the film is drawn.

On the inner end of block 48 is secured a plate 57, and extending through this plate is a screw 58 which is in threaded engagement with the threaded tapped hole 59 in the end of anvil insert 56. A collar 60 secured to the inner unthreaded portion of screw 58, abuts plate 57. Over collar 60 is a retaining piece 61 secured to plate 57, and the screw is thus prevented from axial movement with respect to plate C.

The member 62 is securely attached to the rear end of anvil insert 56 as shown more clearly in Figure 13, and pivotally carries the recording member 63 (Figure 7). A shaft 64 extends through member 63 and is secured at its inner end to member 62. Thus the recording member 63 carrying the stylus or cutter 65, is pivotally movable about shaft 64 to lower or raise the stylus into or out of film engaging position, and is secured with anvil insert 56 to move laterally of the film with the anvil insert. The recorder member 63 may be of any suitable form and is provided with well known means for converting electrical variations of audio frequencies into corresponding movements of the stylus 65.

On the inner end of screw 58 is fixedly attached a sprocket 66, and it is apparent that the turning of sprocket 66 in one direction or another will effect inward or outward movement of the anvil insert 56 and also the recorder member 63 in unison.

For guiding the inside edge of the film as it passes over the anvil, a small guide plate 67 is secured to block 48 and extends upwardly from the top of the anvil surface. For guiding the outer edge of the film and maintaining the film in its proper position, I provide a retaining plate 68 mounted on the outer end of block 48. As shown more clearly by Figure 13, this plate is mounted by means of bolts 69 extending into openings in block 48. Springs 70 engage the heads of bolts 69 to resiliently urge the plate 68 inwardly toward block 48. The plate 68 is provided with an opening 71 which is aligned with channel 55 in block 48 and through which the anvil insert 56 may extend when it is in outer position.

Figure 4:
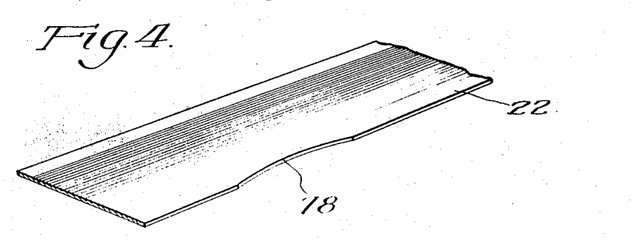
Figure 4, a detail view showing a portion of film containing sound tracks and an edge notch.
Figure 15:
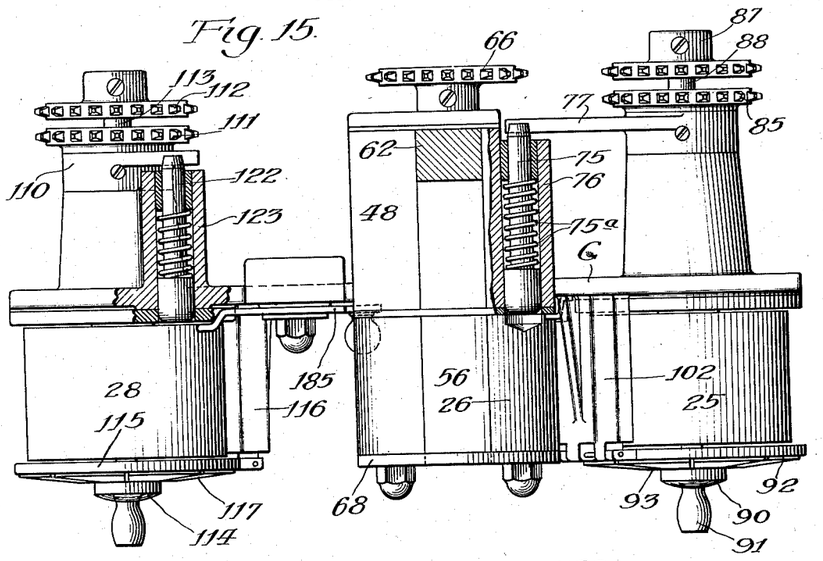
Figure 15, a plan sectional view taken as indicated at line 15—15 of Figure 8 and having parts broken away to show the spring pressed pins of the shifting mechanism.

Referring now to Figure 15 in particular, there is here shown a pin 75 which is slidably carried in the portion 76 of block 48 and is aligned with the film which passes over the anvil. This pin is equipped with a spring 75ᵃ which urges it outwardly against the inner edge of the film. The inner end of pin 75 normally protrudes into the path of the rotatable arm 77, later to be described. Now referring particularly to Figure 4, there is here shown a portion of the film which contains an edge notch 78 on the inside edge of the film. When the film has passed completely through the machine and this edge notch becomes aligned with pin 75, the pin, urged by spring 75ᵃ moves outwardly, and its inner end is retracted from the path of arm 77 so as to allow this arm to rotate. If desired, a locking lever 79 may be pivotally mounted on the outer side of the plate C. As clearly seen in Figure 8, the handle 79ᵃ of the lever may be turned to the right to bring the point 79ᵇ of the lever into the path of pin 75 so as to prevent the retraction of pin 75 though the notch 78 of the film does become aligned with this pin.

The roller 25, under which the film passes before it comes to anvil 26, is rotatably mounted on a tubular bearing member 80, and this bearing member is rigidly held within boss 81 on plate C. Within tubular member 80 is a sleeve 82 and on the outer end of this sleeve a stop collar 83 is secured. The collar 83 abuts the end of tubular member 80 and holds the sleeve against inward movement. Secured on the other end of sleeve 82 and abutting the boss 81 is the arm member 77 which extends forwardly and engages the retractable pin 75. A sprocket 85 is fixedly secured to the arm member 77 and is concentric with the sleeve 82.

Disposed within the sleeve 82 is a shaft 86, and on the inner end of this shaft, is secured a sprocket 87 which is equipped with a pin 88 adapted to engage a socket 89 in the side of sprocket 85. The outer end of shaft 86 has attached thereto a crank 90 which is equipped at its end with a handle 91. A disk 92 extends on the outer side of roller 25 and is hingedly mounted to the post 102 extending outwardly from the plate on the upper side of the roller 25. Outside of this disk is a spring disk member 93 which bears against crank member 90 at its center, and at its peripheral edges bears against disk 92 and so resiliently urges this disk inwardly against the outer edge of the film.

Figure 10:
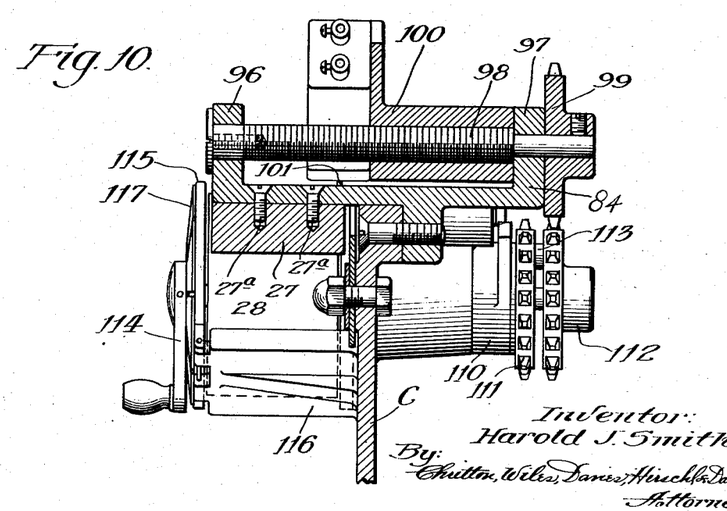
Figure 10, a detail sectional view taken as indicated at line 10—10 of Figure 8.

For supporting the reproducing mechanism there is provided a casting piece 84 which is shown more clearly in Figure 10 of the drawings. This piece, as here shown, is bolted to the plate C and has upwardly extending apertured end portions 96 and 97. A screw shaft 98 is journaled within the apertures of the end portions 96 and 97, and has secured to its inner end the sprocket 99. The central portion of screw shaft 98 is threaded and engages the internal threads of the reproducer member 100. This reproducer member may be of any suitable form and carries the stylus 101 which is adapted to contact the sound track on the film. This reproducer member comprises any suitable or well known mechanism for converting vibrations picked up by the stylus into variations of electrical current. It is pivoted about the screw shaft 98 and so may be lowered into contact with the film or may be raised out of contact with the film.

Figure 3:
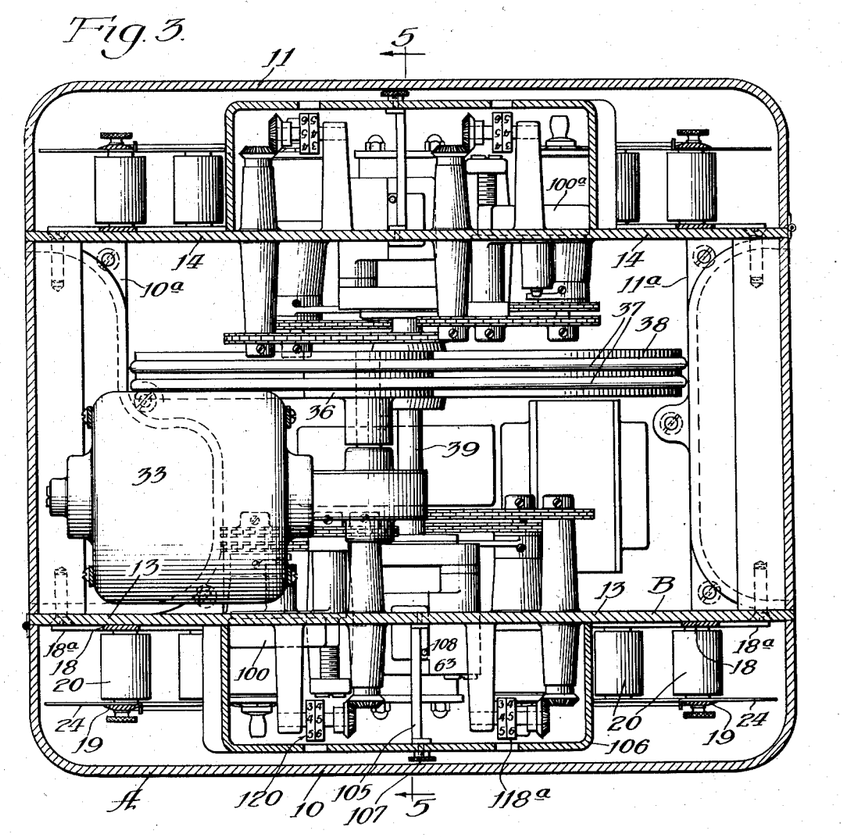
Figure 3, a plan sectional view taken as indicated at line 3—3 of Figure 1.

On the side of reproducer member 100 is a small pin 103, a hook 104 pivotally mounted on plate 13 is adapted to engage pin 103 for locking the reproducer member in raised position with the stylus out of contact with the film. Similarly, there is provision for locking the recording member 63 in raised or inoperative position. The bar 105 is eccentrically mounted between plate 13 and the front casing piece 106 which is attached to plate 13. As more clearly shown in Figures 1 and 3, by turning knob 107, bar 105 may be rotated and moved rearwardly against pin 108 projecting from the recording member 63, and so is effective in holding the recording member 63 in rearwardly tilted position in which the cutter 65 is out of contact with the film.

The roller 28 is mounted similarly to roller 25 and the arm member 110 is secured to a sleeve similar to sleeve 82 already described. The end of arm member 110 extends forwardly and engages the retractable pin 122 extending within plate boss portion 123. Secured to the inside of arm member 110 is the sprocket 111. On the inner side of this sleeve is a shaft similar to shaft 86 already described, which has secured to its inner end a sprocket 112 equipped with the pin 113 engaging sprocket 111. On the outer end of this shaft is secured a crank 114. A disk 115 extends on the outside of roller 28 and has its one edge hingedly attached to post 116 extending from plate C at the lower side of roller 28. Between disk 115 and crank 114 is a spring disk 117 similar to spring disk 93.

For indicating the particular position on the film at which the cutter of the recorder is operating, I provide the mechanism designated by the character 118, which mechanism may be of any suitable or well known character. Preferably, the mechanism should include a numeral wheel 118ª which is driven by a sprocket 119 on the inside of disk 13. An opening in the front of casing portion 106 permits the operator to see one of the numbers on number wheel 118ª. A similar indicating mechanism designated by the character 120 is provided for visibly indicating the sound track which is engaged by the stylus 101 of the reproducing mechanism. Mechanism 120 is driven by the sprocket 121 on the inside of the plate 13.

Figure 9:
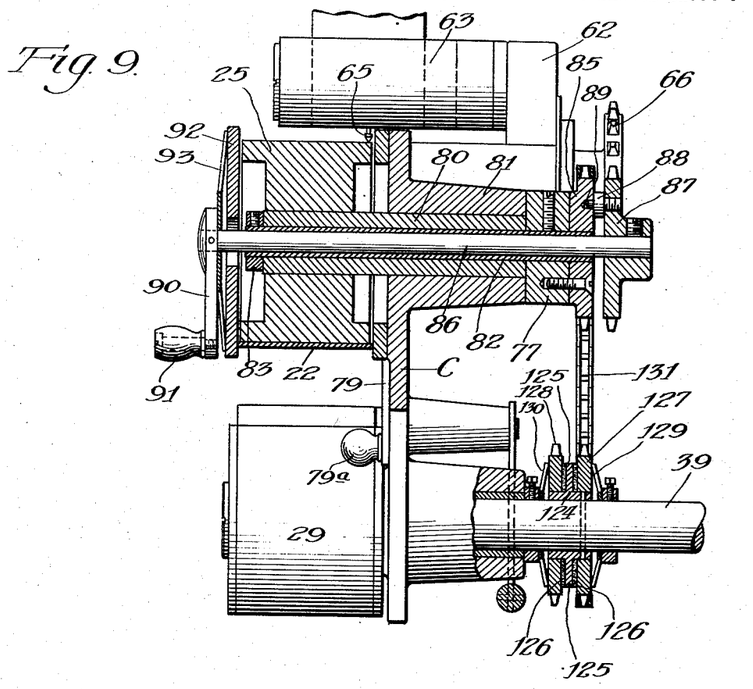
Figure 9, a detail sectional view taken as indicated at line 9—9 of Figure 8.

For actuating the mechanism for changing over the recorder and reproducer from one sound track to the next, I provide a drive arrangement shown more clearly in Figure 9 of the drawings. A collar 124 having a central annular fin 125 is fixedly secured about the main drive shaft 39. On each side of fin 125 is a washer 126 made of felt or some similar material. Rotatably mounted on collar 124 and on each side of fin 125 are sprockets 127 and 128. On each side of collar 124 are the spring disks 129 and 130 which are secured at their centers to main shaft 39 and which at their peripheral edges urge sprockets 127 and 128 against the washers 126. Sprocket 127 is aligned with the sprocket 85 and is connected by chain 131 with sprocket 85; and sprocket 128 is aligned with sprocket 111 and is connected by chain 132 with this latter sprocket. Sprockets 87, 66 and 119 are connected in drive relation by chain 133, and sprockets 112, 99 and 121 are connected in drive relation by chain 134.

Figure 16:
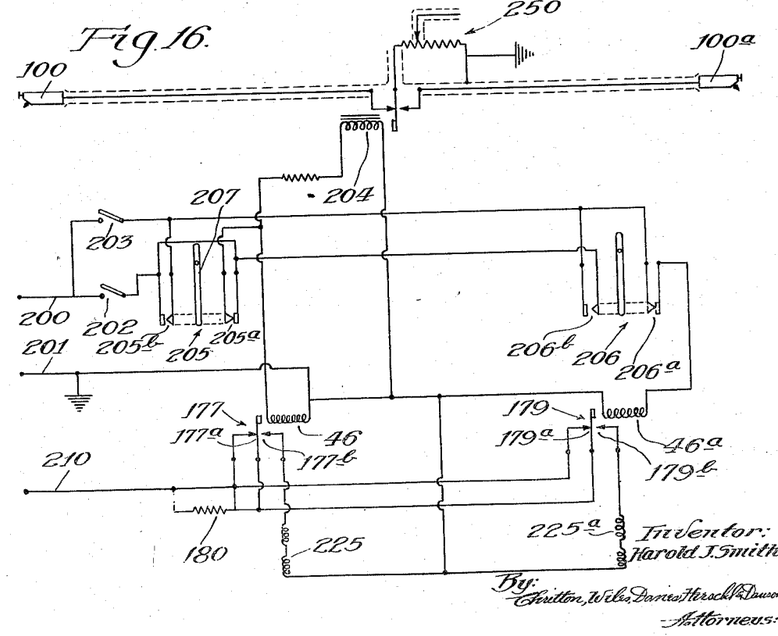
Figure 16, a wiring diagram showing the electrical circuit and switching system.

The electrical circuit is illustrated in Figure 16 of the drawings. As here shown, the conductors 200 and 201 represent the positive and negative sides of a power supply line. Switches 202 and 203 are provided for changing the film drive from one side of the machine to the other. The solenoid 46 has already been described, and the corresponding solenoid on the right hand side of the machine is designated 46ª. The means associated with the recorder member 63 on the left hand side of the machine for converting electrical variations into mechanical movement of stylus 65 has been designated 225, and the corresponding means associated with the recorder on the right hand side of the machine is designated as 225ª. The relay 204 controls the connection of the potentiometer 250 to one or the other of reproducer members 100 or 100ª on left or right sides of the machine, respectively. The output from potentiometer 250 is delivered to a monitoring receiver which converts the electrical variations into sounds.

Each of switches 205 and 206 comprise a pair of spring contact fingers. Referring particularly to switch 205, the pair 205ª are normally in resilient engagement while pair 205ᵇ are normally separated. Similarly pair 206ª of switch 206, are normally in resilient engagement while pair 206ᵇ are normally separated. A pivoted arm 207, the end of which may be seen in Figure 7, controls the operation of contact pairs 205ª and 205ᵇ, through the mechanical connection of its lower end with these contact pairs. The upper end of this arm is provided with an adjusting screw 208 which, when the recording cutter 65 has been moved to the outer edge of the film, contacts the projecting stud 209 on the member 62. Pressure on arm 207 due to this contact causes the arm to be moved about its pivot so as to operate switch 205 in a specific manner. A similar arm 207ª on the right hand side of the machine is operated in a similar manner to operate switch 206.

In preparing the machine for operating the operator attaches a reel loaded with the continuous film ribbon on each side of the machine, and then threads the loose loop into the mechanisms. On the left side, for example, the film is placed under roller 25, over anvil 26, and under the guide member 27. Guide member 27 may be of any suitable form preferably having a curved under surface. As illustrated, this member is secured by screws 27ᵃ to the casting piece 84. From member 27 the film is passed over roller 28, about the drive roller 29 and clutch roller 30. The film guides 150 and 150ᵃ on left and right sides of the machine respectively, help in retaining the film in threaded condition.

Operation

The motor 33 may be energized in any suitable way and caused to rotate preparatory to the actual recording or reproducing of sound. Actuation of the motor operates to rotate pulley 36, and through belt 37 and wheel 38 the main shaft is rotated. The drive rollers 29 and 29ᵃ on respective sides of the machine, being secured to opposite ends of this shaft, then rotate idly without driving the film.

By closing switch 202 (see Figure 16) the operator may start operation of the mechanisms on the left hand side of the machine. The circuit may be traced from the positive side of the power supply line through contact pair 205ᵃ and through solenoid 46 to the negative or grounded side of the line. Energization of solenoid 46 pulls plunger 44 rearwardly, actuating arm 43 to bring the clutch roller 30 against the film which causes the film to be frictionally engaged by the drive roller 29. The film is thus started into motion instantly after the closing of switch 202.

Also, the closing of switch 202 completes a circuit through relay 204 and the recorder on the left hand side of the machine is connected to the monitoring apparatus. Also, as indicated in Figure 16, the operation of solenoid 46 to actuate plunger 44, serves to close the contact 177ᵇ of switch 177, and the audio frequency current received from a microphone and amplifier (not shown) impressed across conductors 201 and 210, is passed through contacts 179ᵃ of switch 179, through contacts 177ᵇ of switch 177, through the cutter actuating means 225, and thence back to conductor 201. Thus, the sounds picked up are recorded as variations in the track of the recording stylus 65. Normally, the styli of the recorder and cutter are aligned so that sounds presently taking place are presently recorded in a sound track, and then an instant later are picked up by the reproducing stylus 101 riding in the same track.

During the above operation the main drive shaft 39 has been exerting a torque tending to turn the sprockets 127 and 128 in the direction of the shaft due to the frictional engagement between these sprockets and washers 126. However, these sprockets are prevented from rotating due to their drive engagements with arm members 77 and 110 respectively, which members are held against rotation by the pins 75 and 122. It will be remembered that the inner edge of the film engages these pins to maintain them in arm-engaging position.

The film proceeds from the inside of the reel, through the various mechanisms and again to the outside turn, continuing in this way until the edge notch 78 comes into register with pin 75. When this occurs, pin 75 moves outwardly under pressure of spring 75ᵃ out of engagement with arm member 77. Such allows arm member 77 to rotate driven by chain 131 connected to drive sprocket 127. Only one revolution of the arm is permitted for by the time one revolution has taken place the film notch will have moved out of registry with pin 75 and this pin will then engage and hold the arm member against further rotation.

The sprocket 87 is driven through the engagement of its pin 88 with sprocket 85, and since each of sprockets 87 and 66 are connected through chain 133, each of these sprockets will be driven one revolution. Revolution of sprocket 66 turns screw 58 which, in turn, moves member 62 and recorder member 63, also the anvil insert 56 outwardly and so causes the cutter 65 of the recorder to cut a second sound track parallel with the first. Revolution of the sprocket 119 operates to turn the recorder groove indicating mechanism 118, showing to the operator that recording is being made in the second, or next consecutive, sound track.

An instant later, when the film edge notch 78 has travelled into registry with pin 122, the arm member 110 is allowed to turn one revolution, being driven through chain 132 by a sprocket 128. Since each of sprockets 112, 99 and 121 are connected by chain 134, each of these sprockets is then turned through one revolution by reason of the engagement of pin 113 with sprocket 111. Revolution of sprocket 99 turns screw shaft 98 causing the reproducer member 100 to be shifted outwardly causing the stylus 101 to move to the next consecutive track in the same path as was taken by the recorder cutter 65. At the same time revolution of sprocket 121 operates the indicating mechanism 120 to show to the operator the number of the track on which the reproducing stylus is now operating.

Each time the film edge notch 78 passes through the mechanisms, the above shifting operations take place until substantially the whole of the film has been used and contains, for example, 80 parallel sound tracks. At this time the stud 209 on recorder member 63 engages screw 208 in the end of switch arm 207 and causes this arm to move about its pivot. The switch 205 is so adjusted that upon the initial movement of arm 207 contact fingers 205ᵇ are engaged, but the engagement between pair 205ᵃ is not yet broken. After such initial movement of switch arm 207 there is an additional circuit completed through contact pair 205ᵇ, through contact pin 206ᵃ, and through solenoid 46ᵃ to ground. Energization of solenoid 46ᵃ operates the clutch roller on the right hand side of the machine to start the movement of film on the right hand side. Also, the switch 179 is operated by solenoid 46ᵃ, causing contacts 179ᵃ to be disengaged and contacts 179ᵇ engaged. This changes the circuit traversed by the audio frequency current. Now the audio frequency current may pass from conductor 210 through resistance 180 and through both of the cutter actuating mechanisms 225 and 225ᵃ to ground. With this circuit condition the cutter actuating mechanisms are connected in parallel and so present a lower impedance which, were it not for the resistance 180, would require a change in the amplifier for balanced impedance. However, as the resistance is cut in when the recorders become connected in parallel, the overall impedance for matching the impedance of the amplifier remains the same.

Recording will take place simultaneously on each side of the machine after this initial movement of the switch arm 207. Upon further movement of the recording member 63 outwardly, the switch arm 207 will have moved so as not only to make contact between pair 205ᵇ but to break contact between pair 205ᵃ. Such breaks the circuit through solenoid 46 causing the clutch roller 30 to be retracted and the film on this left hand side immediately stopped. Also the circuit through relay 204 is then broken and the reproducer arm or the right hand side of the machine is connected to the monitoring set. Also the contacts 177ª engage causing the audio frequency current to pass from conductor 210 through contacts 177ª, through contacts 179ᵇ, and through the cutter actuating mechanism 225ª to ground. It will be noted that mechanism 225 and resistance 180 are omitted in this last mentioned circuit.

With the film on the left hand side of the machine now stopped the operator may remove this film and replace it with a new one, and set back the recording and reproducing mechanisms in position to begin on the inner edge portion of the new film. However, before setting back the mechanisms, the operator should close switch 203 and open switch 202, so that the circuit through solenoid 46ª will not be broken as the stud 209 on member 62 disengages from switch arm 207.

The operation of the right hand side of the machine is similar to that already described in connection with that of the left hand side of the machine, the undulatory grooves being formed in the same manner, and the shifting of the mechanisms laterally of the film to form parallel grooves being accomplished as before described. When the film on this right hand side has been substantially covered with the sound grooves, the left hand side of the machine is again placed in operation, and the movement of the right hand film instantly stopped, the switching to accomplish this being similar to that already described. In this way a continuous sound record can be kept with a minimum of attention on the part of the operator.

If during the operation of the machine on either side, it is desired that the reproducer repeat the speech or music which has been recorded at some previous period without interrupting the operation of the recorder, the operator may simply push the crank member 114 inwardly to disengage the pin 113 from sprocket 111 and then turn this crank 114 in one direction or another to bring the recording styles 101 into contact with any desired groove. The indicating mechanism 120 will also be turned and will indicate the number of the groove with which the recording stylus 101 is in contact. It will be noted that with such construction the recording stylus may be moved inwardly or outwardly with equal ease and without in any way affecting the operation of the recording mechanism.

Similarly, the position of the cutting stylus 65 of the recording mechanism may be manually adjusted by pushing crank member 90 inwardly to disengage the pin 88 from sprocket 85 and turning this crank member in one way or another so as to move the recording stylus 65 to the desired position transversely of the film. As the recording stylus 65 is moved from one position to another the indicating mechanism 118 is also moved and visibly indicates the number of the groove being presently cut by the recording stylus.

If it is desired only to record sounds on the film, the reproducer member 100 may be locked up in inoperative position by causing the hook 104 to engage the pin 103 on this member. In this case it may be found convenient or desirable to operate the lever 185 causing the reproducer shifting mechanism to remain inoperative and holding the reproducer stylus 101 at the same groove where reproduction of the sound was terminated. Also, there may be times at which it is desired only to reproduce sound from the film without recording sounds presently taking place. This may be accomplished by turning knob 107 to cause the recorder member 63 to be locked in inoperative position. In this case it may be convenient or desirable to operate the lever 79 causing the recorder shifting mechanism to remain inoperative, holding the recording stylus or cutter 65 in the same position as it was when recording was terminated.

The importance of guiding and maintaining the film in a true lateral position as it passes through the recording and reproducing mechanisms, cannot be over emphasized. In the construction herein described, the film, in passing about roller 25 is resiliently engaged on its outer edge by the spring pressed guide plate 92. It will be noted that the post 102 to which this plate is hingedly mounted, is on the side of the roller which is opposite the film. The film then is maintained in true lateral position and not allowed to oscillate from side to side as it passes under roller 25.

Also, as the film passes over anvil 26, there is provided resilient film engaging means for maintaining the lateral alignment of the film to prevent the film from oscillating back and forth laterally. Each of the spring pressed plates 92, 68 and 115 resiliently engage the outer edge of the film and properly confine the film allowing for its expansion due to the cutting of grooves upon the face of the film.

In previous constructions where the reproducer member has been secured to a recorder member and movable laterally of the film with the recording member, a serious objection was that the mechanical vibrations transferred through the reproducing mechanism to the recording mechanism, had an effect upon the movement of the recording stylus and this effect produced distortion in the record transferred to the film. In the machine herein described, the recording mechanism and the reproducing mechanisms are each mounted on plates C and C' separately, and are movable separately laterally of the film. In fact, it will be seen that the recording and reproducing mechanisms on each side of the machine are shifted laterally at different times. This construction allows almost no vibration from the reproducing stylus to be transferred to the recording stylus, due to the damping effect of plates C and C'.

The solenoid operated clutch means for connecting the film in drive relation with the drive roller is a rapidly operating mechanism, and upon energization of the solenoid a film is immediately started in motion; upon deenergization of the solenoid the film stops instantly. The efficiency of such clutch mechanism is demonstrated by the fact that the machine may be stopped while reproducing a spoken word without distortion or change in the frequency of reproduced sound. The starting of the film in motion is probably even more rapid.

It is understood that many changes may be made in the structure herein specifically described without departing from the spirit of the invention. For example, though sprockets and chains have been described as a means of driving the shifting mechanism, it is obvious that other different drive mechanism might be substituted for such chain and sprocket means without disturbing the character of the invention. Also, changes may be made in the form and arrangement of the various members, and such changes are deemed to be within the scope of this invention.

The above outlined description has been given for clearness of understanding only, and no unnecessary limitations should be understood therefrom, but the appended claims should be construed as broadly as permissible, in view of the prior art.

What I claim as new and desire to secure by Letters Patent is:

1. In a sound recorder, a reel carrying a continuous ribbon of film, recording mechanism within said reel for forming upon said film undulatory grooves representative of sound variations, drive means also within said reel and adapted to pass said film along said recording mechanism in engagement therewith, said drive means and recording mechanism being alinged in the plane of said reel.

2. In a machine of the character set forth having a continuous film ribbon for receiving a record of sound thereon; a recording mechanism in engagement with said film and equipped with means for forming on said film undulatory grooves representative of sound vibrations; means for shifting said means laterally of said film step by step whereby a series of undulatory grooves are formed; motor operated means for actuating said shifting means; and manually operable means releasably engaged with said motor operated means for actuating said shifting means independently of said motor operated means.

HAROLD J. SMITH.